US008412997B2

(12) United States Patent
Qian et al.

(10) Patent No.: US 8,412,997 B2
(45) Date of Patent: Apr. 2, 2013

(54) METHOD AND SYSTEM FOR MESSAGE RETRANSMISSION AND INTERSYSTEM MESSAGE DELIVERY

(75) Inventors: Zhilong Qian, Hangzhou (CN); Li Cheng, Hangzhou (CN); Lei Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 822 days.

(21) Appl. No.: 12/295,246

(22) PCT Filed: Mar. 28, 2007

(86) PCT No.: PCT/CN2007/000996
§ 371 (c)(1),
(2), (4) Date: Apr. 9, 2009

(87) PCT Pub. No.: WO2007/112667
PCT Pub. Date: Oct. 11, 2007

(65) Prior Publication Data
US 2009/0300449 A1 Dec. 3, 2009

(30) Foreign Application Priority Data
Mar. 30, 2006 (CN) .......................... 2006 1 0066367

(51) Int. Cl.
*G06F 11/00* (2006.01)
(52) U.S. Cl. ..................................................... 714/748
(58) Field of Classification Search .................. None
See application file for complete search history.

(56) References Cited

U.S. PATENT DOCUMENTS

| | | | |
|---|---|---|---|
| 5,774,479 A | 6/1998 | Lee et al. | |
| 6,922,557 B2 * | 7/2005 | Fantaske | 455/403 |
| 7,389,462 B1 * | 6/2008 | Wang et al. | 714/748 |
| 2002/0150045 A1 | 10/2002 | Vogtmeier et al. | |
| 2003/0028837 A1 * | 2/2003 | Oh | 714/748 |
| 2003/0067921 A1 | 4/2003 | Sivalingham | |

FOREIGN PATENT DOCUMENTS

| | | |
|---|---|---|
| CN | 1822533 | 8/2006 |
| CN | 1947393 | 4/2007 |
| JP | 01305742 | 12/1989 |
| JP | 06197100 | 7/1994 |
| JP | 2002149480 | 5/2002 |
| JP | 2005094429 | 4/2005 |
| JP | 200613841 | 1/2006 |
| WO | WO03105420 A1 | 12/2003 |
| WO | WO2005109804(A2) | 11/2005 |

OTHER PUBLICATIONS

Translated the Japanese Office Action mailed Aug. 2, 2011 for Japanese patent application No. 2009-501820, counterpart foreign application of U.S. Appl. No. 12/295,246, 2 pages.

(Continued)

*Primary Examiner* — Michael Maskulinski
(74) *Attorney, Agent, or Firm* — Lee & Hayes, PLLC

(57) ABSTRACT

The present invention discloses a method and a system for resending messages with a minimized number of retries and maximized timeliness of delivering the message to the receiving party. The method sets a retry period for a message that needs to be resent, determines a retry time according to the retry period, and sends the message after the retry time is reached. The retry period increases as the number of retries increases. The method and the system can ensure reliable delivery of notification messages and support many transmission protocols between different systems, does not require the receiving party to implement complicated interaction protocols to reliably receive a notification message, and is suitable for widespread use in the Internet. Moreover, the disclosure supports multiple transaction processing, can be used as a common business transaction application platform, and allows flexible expansion of multiple transactions and multiple protocols.

14 Claims, 8 Drawing Sheets

OTHER PUBLICATIONS

Translated the Japanese Office Action mailed Feb. 10, 2012 for Japanese patent application No. 2009-501820, a counterpart foreign application of U.S. Appl. No. 12/295,246, 4 pages.

The Chinese Office Action mailed Oct. 31, 2008 for Chinese patent application No. 2006100663679, a counterpart foreign application of U.S. Appl. No. 12/295,246, 8 pages.

* cited by examiner

METHOD AND SYSTEM FOR MESSAGE RETRANSMISSION AND INTERSYSTEM MESSAGE DELIVERY

This application claims priority from Chinese patent application, Application No. 200610066367.9, filed Mar. 30, 2006, entitled "METHOD AND SYSTEM OF MESSAGE RETRANSMISSION", and incorporates the Chinese patent application in its entirety by reference.

TECHNICAL FIELD

The present invention relates to the fields of data transmission, and particularly to methods and systems for message retransmission and intersystem message delivery.

BACKGROUND ART

In the field of data transmission, an increasing number of application systems use message notifications as their mode of interaction. During message transmission, a message may be lost in the middle of its transmission and could not be timely and reliably delivered because of a failure in transmission links or systems. To solve this problem, various message resending mechanisms are developed and used for resending unsuccessfully delivered messages. In these resending mechanisms, attempts are made to send the message again if the first delivery fails. This can resolve the problem of undeliverable messages to a large extent. However, for medium and long term communication failures, too many resending attempts may be made which not only waste time but also use up system resources and cause low delivery efficiency.

In the design of network protocols, many retransmission backoff algorithms targeting the failures of data transmission have been developed. The most popular is Binary Exponential Backoff (BEB) algorithm. In the following, the Ethernet 802.3; protocol is used as an example to illustrate this algorithm in details.

The 802.3 protocol uses CSMA/CD (Carrier Sense Multiple Access with Collision Detection) algorithm to solve the problem of data collision on a shared channel. The algorithm constantly listens to the channel until the channel becomes idle. Once the channel is idle, the data is sent instantly. If data collision occurs, the sending will stop immediately. An attempt of resending is then made after a retry period. The retry period is calculated using Binary Exponential Backoff algorithm. The algorithm first divides time into slices with each time slice of t (51.2 millisecond) long. At the $i^{th}$ collision, the retry period will be set as a time randomly chosen between 0 to $(2^i-1)*t$, which has a time length of an integral multiple of t.

Binary Exponential Backoff algorithm allows the retry time interval (period) to increase exponentially when a failure occurs in data transmission. However, such algorithms for calculating the retry time intervals based on a random failure pattern is not suitable for regular failure pattern of Internet intersystem message notifications, and often cause a longer time for failure recovery. Usually, the causes for a failure in Internet intersystem message notification are overtime transmission due to a busy network, a failure in network system, a failure in application system, or scheduled system shutdown for maintenance, etc. Although the occurrences of these failures are random, the failure recoveries are not and have certain patterns, because failure recoveries are intervened by human detection and maintenance. Moreover, the time for failure recovery over the Internet is normally measured in hours and days. During that period of time, a large amount of unsent messages may be accumulated. Therefore, highly efficient and flexible algorithm and system for message storage, management and retransmission scheduling are needed. It is very meaningful to develop a method and a system that are suitable for message retransmission over the Internet while at the same time achieving a flexible balance between occupancy of system resources and timely recovery of message notification.

DESCRIPTION OF THE INVENTION

The present invention aims to provide a technical solution of a method and a system of message retransmission that can minimize the number of retries while maximizing the timeliness of sending a message to a receiving party.

To this end, this invention provides a method of message retransmission, which includes:

setting a retry period for a message that needs to be resent, and determining a retry time using the retry period;

increasing the retry period as number of retries increases; and sending the message after the retry time is reached.

Optimally, using the retry period to determine the retry time includes setting the retry time to be a current time plus the retry period.

Optimally, when the number of retries reaches or exceeds a preset value, automatic resending is abandoned.

Optimally, when the retry period reaches or exceeds a preset value, automatic resending is abandoned.

Optimally, an increment of the retry period varies as the number of retries increases, and the size of the increment can be set according to different external systems.

The present invention also provides a system of intersystem message notifications. The system includes:

a database, used for storing messages that wait for sending;

a notification executing unit, used for sending and resending the messages, wherein when the sending of a notification message fails, the notifying executing unit sets a retry period for the message and updates a retry time of the message in the database according to the retry period, and retry period increases as the number of retries increases; and a notification recovering unit, used for checking whether the retry time of any notification messages waiting to be resent is due, wherein if the retry time of any notification message is due, the notification recovering unit triggers the notification executing unit to resend the identified message.

Optimally, the notification recovering unit runs at set times.

The invention also provides a method of intersystem message notifications, the method including:

storing a notification message;

sending the stored notification message;

setting a retry period for the notification message if the sending of the notification message fails, and determining a retry time using the retry period, wherein the retry period increases as the number of retries increases; and sending the notification message after the retry time is reached.

Optimally, the notification message is a message that needs to be sent to an opposite end by a business application. A failure of sending the notification message includes such situations as no return message being received from the opposite end or no message of a successful business transaction being received from the opposite end.

Optimally, the step of resending the notification message includes: identifying, at preset periods, notification messages that are due for retry; and resending the notification messages identified.

Optimally, the method of intersystem message notifications also includes deleting the stored notification message if the sending of the corresponding notification message is successful.

The present invention also provide a system of message retransmission, which includes: a retry period unit, used for setting a retry period for a message that needs to be resent, wherein the retry period increases as the number of retries increases; a retry time unit, used for determining a retry time according to the retry period; and a sending unit, used for sending the message after the retry time is reached.

Targeting the pattern of short-term and medium and long term communication failure, the method and system of this invention provide a practical and efficient way of handling timeout and message resending. As the number of retries increases, the interval between retry times increases. The change in the retry time interval represents a balanced consideration of timeliness and efficiency of notification recovery at the same time. For short term communication failures, the invention can timely send a message notification to an opposite end after the failure is fixed; while in the event of a medium and long term failure the cost of making too many unnecessary retries may be avoided.

EXEMPLARY EMBODIMENTS

As electronic commerce based on the Internet rises to a more and more important position in the today's society, an increasing number of business entities organize information flow, fund flow and logistics over the Internet. The number of Internet application systems using message notifications as the interaction mode is on the rise. One example is banking. After a user completes a payment with a bank, the bank needs to inform a merchant system using a notification message about the status of the user payment. Another example is third-party secure transaction platform. After a user has advanced a business transaction on the transaction platform, the transaction platform needs to inform a related external merchant system the current status of the business transaction. These are typical examples of Internet-based message notifications. The present invention is suitable for use between any cooperating systems, but the design is particularly targeting the common causes of message notification failures over the Internet. Therefore, in the following, a preferred embodiment of message notification is used as an example for illustration.

There are several possible causes of the failure in intersystem message notification over the Internet: the network is temporarily busy and causes an overtime for transmission protocol; the network temporarily disconnects; the opposite server is temporarily busy and cannot respond to the request; the opposite end has a bug and hence cannot respond to the request or incorrectly processes the request; the opposite server hangs and therefore cannot respond to the request; a long-term failure in the network causes an outrage of hours or even days; a long-term failure in opposite end causes unavailability of hours or even days; and the opposite end does not exist or has been permanently shut down.

From the reasons observed above, the causes for a failure in message notification can disappear or be relieved in a few minutes, but can also last for hours and even days. Accordingly, a preferred retry strategy for message notification should aim to achieve the following: when the cause disappears or is relieved in a few minutes, message notification is timely sent to the opposite party; when the cause needs several hours or even several days to disappear, the system can still send the message notification to the opposite party, but without making too many unnecessary retries. Therefore, the present invention preferably adopts a retry interval determination method described below to determine a retry time interval. In this description, the retry time interval refers to a retry period.

Figure 1:
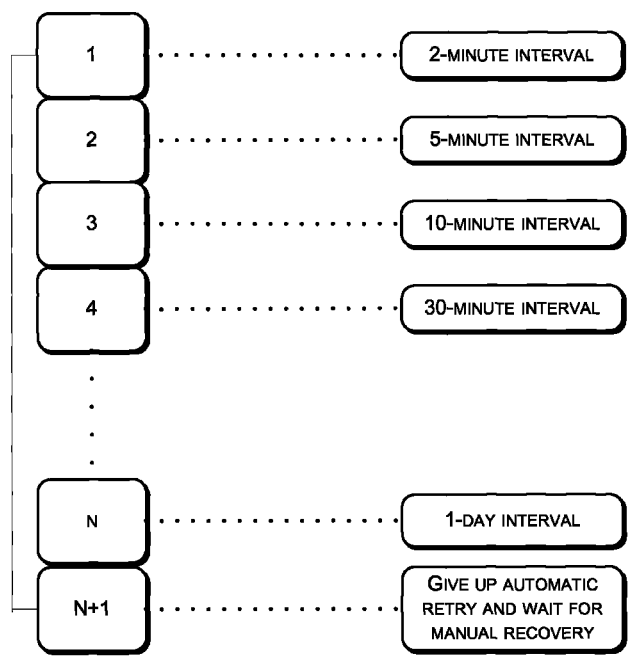
FIG. 1 shows a conceptual diagram of a method for determining retry periods in accordance with the present invention.

FIG. 1 shows a conceptual diagram of a method for determining retry intervals. The retry interval determination method is described as follows.

Assume there are multiple boxes numbered from 1 to n+1, among which the boxes numbered 1 through n is each associated with a timer. Each timer has a set time which increases as the box's numbering increases. For example, the set time for box number 1 is two minutes, for box number 2 is five minutes, for box number 3 is ten minutes, and so forth. The box numbered n+1 has no timer, indicating that the message would never reach the message receiving party, and should give up auto-retry and wait for manual recovery.

In operation, after a message notification has failed for i number of times, it will be placed in box numbered i; after the set time of the timer for box numbered i is reached, all message notifications in this box will be triggered for retries; and after a message notification has failed for n+1 times, it will be placed into the box numbered n+1. Since there is no timer for box numbered n+1, the system has given up on automatic retry for this message notification and passes this message notification for manual processing.

The notification system in this invention can also adjust the timer on each box according to the characteristics of different types of external systems in order to conform to the failure pattern of the corresponding external system.

As described above, the core idea of the message resending method of this invention is to increase the retry period as the number of retries increases. In the retry interval determination method as shown in FIG. 1, if the number of retries for message notifications is few, it indicates that the cause for the failure in sending notification messages has disappeared in a short time. Since the time interval between each retry is small in this case, this can ensure timely delivery of notification messages when the cause is fixed. However, if the number of retries for message notification is large, it indicates that there has been a long-term communication failure causing unsuccessful delivery of notification messages. As the subsequent retry time intervals become progressively longer, this will effectively avoid many unnecessary retries and reduce the occupancy of system resources while still ensuring the delivery of the notification message. Therefore, the described retry interval determination method can both ensure timely recovery of message notification in events of short-term communication failures and avoid many useless retries of notification during long-term communication failures. As such, the described retry interval determination method can achieve both the timeliness and the efficiency of notification recovery at the same time.

The above-described criterion for abandoning auto-retry is expressed in the number of retries reaching a preset value. However, the present invention is not limited to this type of a criterion. For instance, auto-retry can also be abandoned when the retry period reaches a preset value. Depending on different application systems or different transaction conditions, any method for setting a preset value may be selected to avoid unlimited number of attempts for resending.

In the retry period determination method of the invention, preferably, an increment of a retry period varies as the number of retries increases. That is, a difference between a current retry period and a previous retry period may not be the same as a difference between a next retry period and the current retry period. As shown in FIG. 1, a time interval between set times of boxes numbered 3 and 2 is five minutes while a time interval between set times of boxes numbered 4 and 3 is twenty minutes. Therefore, the increments of the retry periods are five minutes and twenty minutes respectively, and are not fixed. On the other hand, a method using a fixed increment for the retry periods can also be used. In a preferred method, changes in the increments of the retry periods can be set according to different systems at the opposite end. Tailoring to the characteristics of different types of opposite systems, different increments for the retry periods and different time intervals for the retry times can be set. Such settings balance the considerations of the timeliness and the efficiency of sending messages and satisfy the needs of the applications better.

Figure 2:
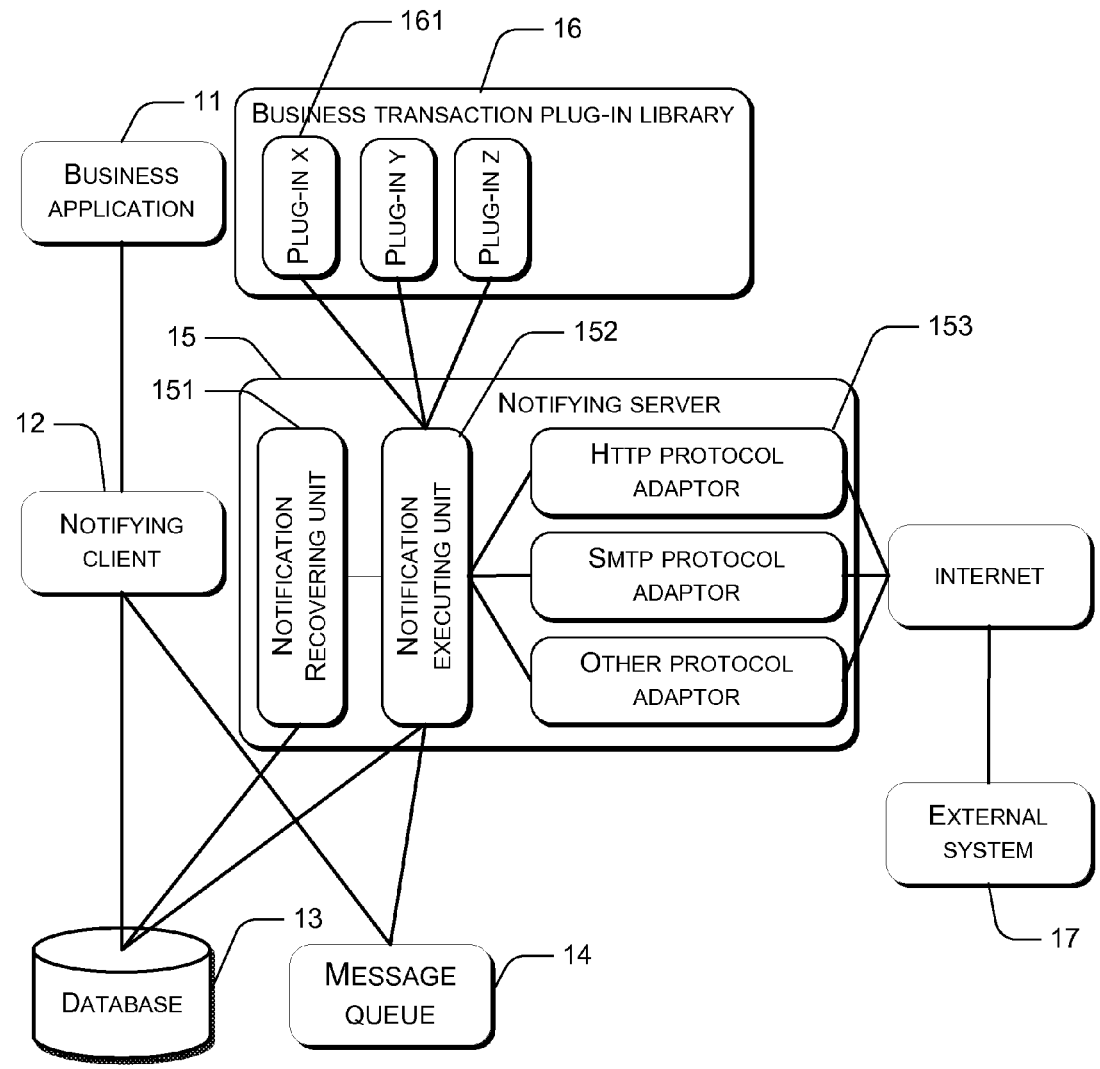
FIG. 2 shows a schematic diagram of a system for intersystem message notification.

FIG. 2 shows a schematic diagram of an apparatus and a system for reliable intersystem message notification. The message notification system can use the message resending method disclosed in the invention. The message notification system may include:

A database 13, used for storing notification messages to be sent. The notification messages to be sent include the new notification messages which have not been sent and the notification messages which are waiting to be resent.

A notification executing unit 152, used for sending new notification messages or notification messages that need to be resent. If the delivery of a notification message is successful, the notification executing unit 152 will delete this notification message from the database 13. Otherwise, the notification executing unit 152 will set up a retry period for the notification message, set a retry time to be a current time plus the retry period, and update a corresponding parameter of the notification message in the database 13 (e.g., update the retry time of the notification message in the database 13). The retry period increases as the number of retries increases.

A notification recovering unit 151, used for checking whether the retry time of any notification messages waiting to be resent is due. If the retry time of any notification message is due, the notification recovering unit 151 notifies the notification executing unit 152.

As shown in FIG. 2, a business application 11 can be any merchant application and is an initiator of the process of message notification. An external system 17 can be any merchant system and plays the role of receiving party of notification message. The notification system in this invention is used to deliver a notification message received from the business application 11 and to ensure reliable delivery of the notification message to the external system 17 through the Internet.

The database 13 can be any commonly used relational database and is used for storing new notification messages that are waiting for delivery and the notification messages which have failed to be delivered previously and are now waiting to be resent. A notifying client 12 can be a client module used by the business application 11 and may be embedded in the business application system. The business application 11 can use the notifying client 12 to register a notification message. Once the registration of the notification message is successful, the notification system can ensure that the notification message is delivered to the receiving party of the message even if the message receiving party is offline or the network is temporarily disconnected. The registration process of notification message can have the notifying client 12 store a notification message received from the business application 11 into the database 13 and trigger an immediate delivery of the notification message through the message queue 14. The business application system refers to a system that processes relevant transactions in connection with the business application 11. Illustrated using message notification between an online bank and a merchant as an example, the business transaction associated with the notification message refers to a user making an actual payment with the online bank. If the payment is complete, the business transaction is submitted in completion. Otherwise, the business transaction is still in progress. The notification message refers to a result of the user payment indicating whether the payment is complete or not. Transaction is a technical term and represents a group of operations having ACID characteristics. When a transaction is created, it is desired to ensure that the transaction has some self-managing characteristics. These characteristics are called ACID. ACID stands for Atomicity, Consistency, Isolation and Durability.

Embedding notifying client 12 into the business application system allows the completion of business transaction processing and registration of notification message in the same database transaction, and therefore can completely avoid the inconsistency between business transaction processing and message notification. Here, consistency means that the notification message can be successfully registered and sent immediately only after the corresponding business transaction is completed. The database used in the database transaction can be the system's database that stores the notification messages. Normally, this database is the same database in the business application system for storing the business transaction data. Using the same database allows the implementation of registration of notification message and processing of business transaction data in the same database transaction without using a complicated distributed transaction mechanism with low efficient. However, the consistency between registration of notification message and processing of business transaction data can be maintained through a distributed transaction mechanism using different databases.

The message queue 14 is a standard middleware for asynchronous information communication between systems. Using message queue 14, the processes of sending and receiving messages can be asynchronous, while the sender and the receiving party of the message are allowed to communicate indirectly through the message queue 14. This minimizes the mutual dependence between the sender and the receiving party of the message and therefore allows both parties to perform their respective tasks relatively independently. The message queue can generally send the message to the receiving party immediately upon receiving the message, as long as the receiving party of the message is in normal operation. In this exemplary embodiment, the message queue 14 is used to trigger an immediate delivery of the notification message.

Notifying server 15 can be a server or a group of individual servers that are responsible for sending and resending notification messages. The notifying server 15 may include a notification recovering unit 151, a notification executing unit 152 and various protocol adaptors 153. The notification recovering unit 151 is a module responsible for scheduling to resend at set times the notification messages which experienced unsuccessful deliveries. The notification executing unit 152 is a module that executes the actual delivery of the notification messages. Each protocol adaptor of the various protocol adaptors 153 supports a transmission protocol and completes the actual data transmission with the external system 17 through the Internet. A business transaction plug-in library 16 includes different business transaction plug-ins 161. The business transaction plug-ins 161 correspond to different transaction types and are responsible for the pre-processing before the delivery of notification messages and the processing of the returned result messages. The pre-processing and the return processing are closely related to the business applications. Different business applications may have different handling processes.

Figure 3:
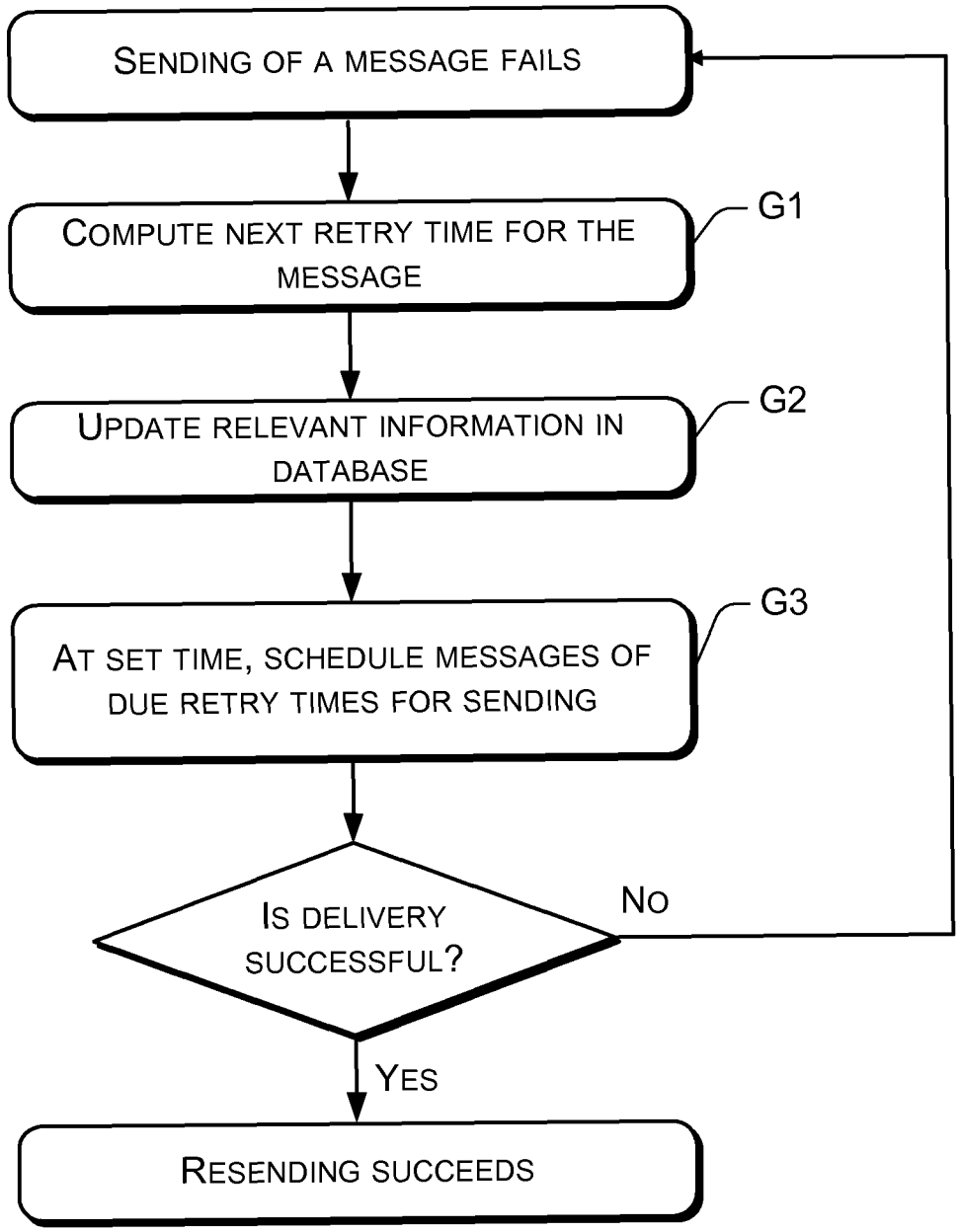
FIG. 3 shows a flow chart of a method of resending a message in accordance with the present invention.

FIG. 3 shows a flow chart of a method of resending a message in accordance with the present invention. This process is the message resending process used by the notification system shown in FIG. 2. Any person of ordinary skills in art should understand that the message resending method is also suitable for use in any Internet nodes that utilize other kinds of sending implementations.

If the sending of a message fails, the process of resending message enters into the following procedure:

Step G1 computes a next retry time for the message. A notification executing unit computes a time interval for next retry according to a retry period determination method and sets the next retry time for resending the message to be a current time plus the computed retry period. The retry period increases as the number of retries increases.

Step G2 updates relevant information in a database. Based on the calculated retry period, the notification executing unit updates the time for sending the message in the database to be the retry time, and waits for a notification recovering unit to perform a re-schedule.

At Step G3, the notification recovering unit recovers the sending of messages, and at set times schedules and sends the messages that have a due retry time.

Figure 4:
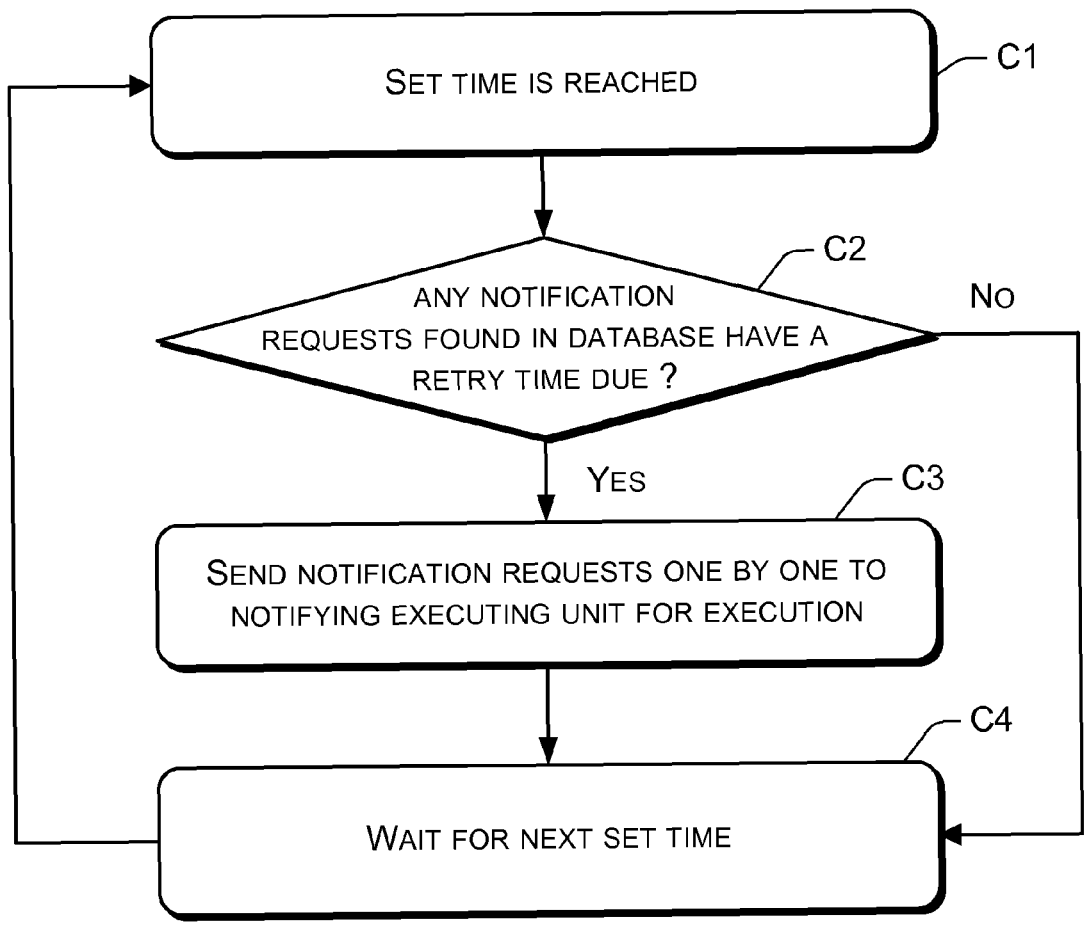
FIG. 4 shows a flow chart of recovering a message notification in the disclosed message resending method.

FIG. 4 shows a flow chart of recovering a message notification. The notification process enters into notification recovery when a notification message needs to be re-sent. Optimally, the notification recovering unit runs at set times. In each run, the following steps are executed:

At Step C1, a notification recovering unit waits for a set time and starts to operate when the time is reached.

At Step C2, the notification recovering unit finds in the database those message notification requests that have a due retry time. The notification recovering unit checks the message notification requests that need retries, and compares the retry times calculated by a notification executing unit with the set time of the current run. If any retry time is smaller than or equal to the set time, there exists a message notification request with a due retry time, and the notification process continues to Step C3. Otherwise, the current run of retry is abandoned, and the process goes to Step C4.

At Step C3, for those notification messages having a due retry time, the notification recovering unit sends a retry request to the notification executing unit and provides the notification messages one by one to the notification executing unit for delivery.

At Step C4, the notification recovering unit waits for the next set time for the next run.

Normally the set time interval for running the notification recovering process is fixed, once a minute, for example. The size of the interval between set times has an impact on the timeliness of notification recovery. Therefore it is desirable to set the time interval as smaller as possible, but this must be within the tolerance of the notifying server. It is noted that the set time interval is not the same as the retry interval for message notification. The retry time interval for message notification is individually calculated and set for each notification message through a retry interval determination method.

Referring to Step G3 of FIG. 3, if sending in Step C3 is successful, the resending of the message is completed. Otherwise, the process goes to G1.

Figure 5:
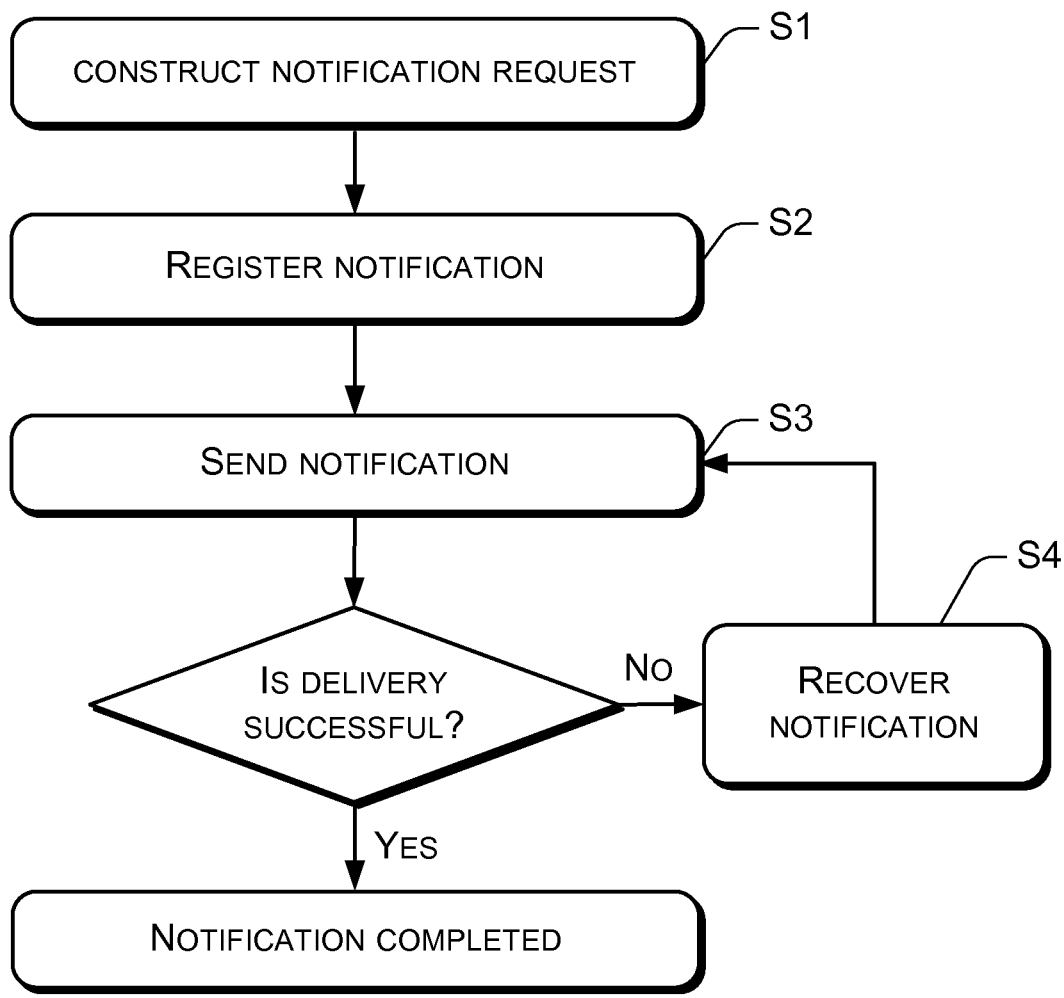
FIG. 5 shows a flow chart of a method of reliable intersystem message notification.

The present invention also provides a method of reliable intersystem message notification which can be used in the notification system shown in FIG. 2. FIG. 5 shows a flow chart of a method of reliable intersystem message notification. When a business application needs to send a notification message to an external system, reliable delivery of the notification message can be achieved by performing the following steps:

At Step S1, a business application packages its notification needs into a message notification request and sends this request to a notifying client of the notification system.

At Step S2, the notifying client registers the notification message. Once registration of the notification message is done, the business application can continue to perform its other transactions. The notification system ensures the delivery of the notification message to a receiving party, even if the receiving party of the message is offline or temporarily disconnected at the time.

At Step S3, after the notification message is successfully registered, the notification system sends out the notification message. If the opposite end is successfully notified, the task of message notification is completed. Otherwise, the process will continue to Step S4. In this invention, a successful message notification includes a successful delivery of the message to the opposite end and receiving from the opposite end a message of a successful business transaction.

Step S4 performs a recovery of message delivery and schedules to resend at a proper time the notification messages which have had unsuccessful deliveries. The process then returns to Step S3.

In this process, Steps S4 can be executed at the same time with Steps S1, S2 or S3. Step S4 is the same as Step G3 described above and its details can be found in the flow chart of recovering a message notification in FIG. 4. In the following, Steps S2 and S3 are individually described in further detail.

Figure 6:
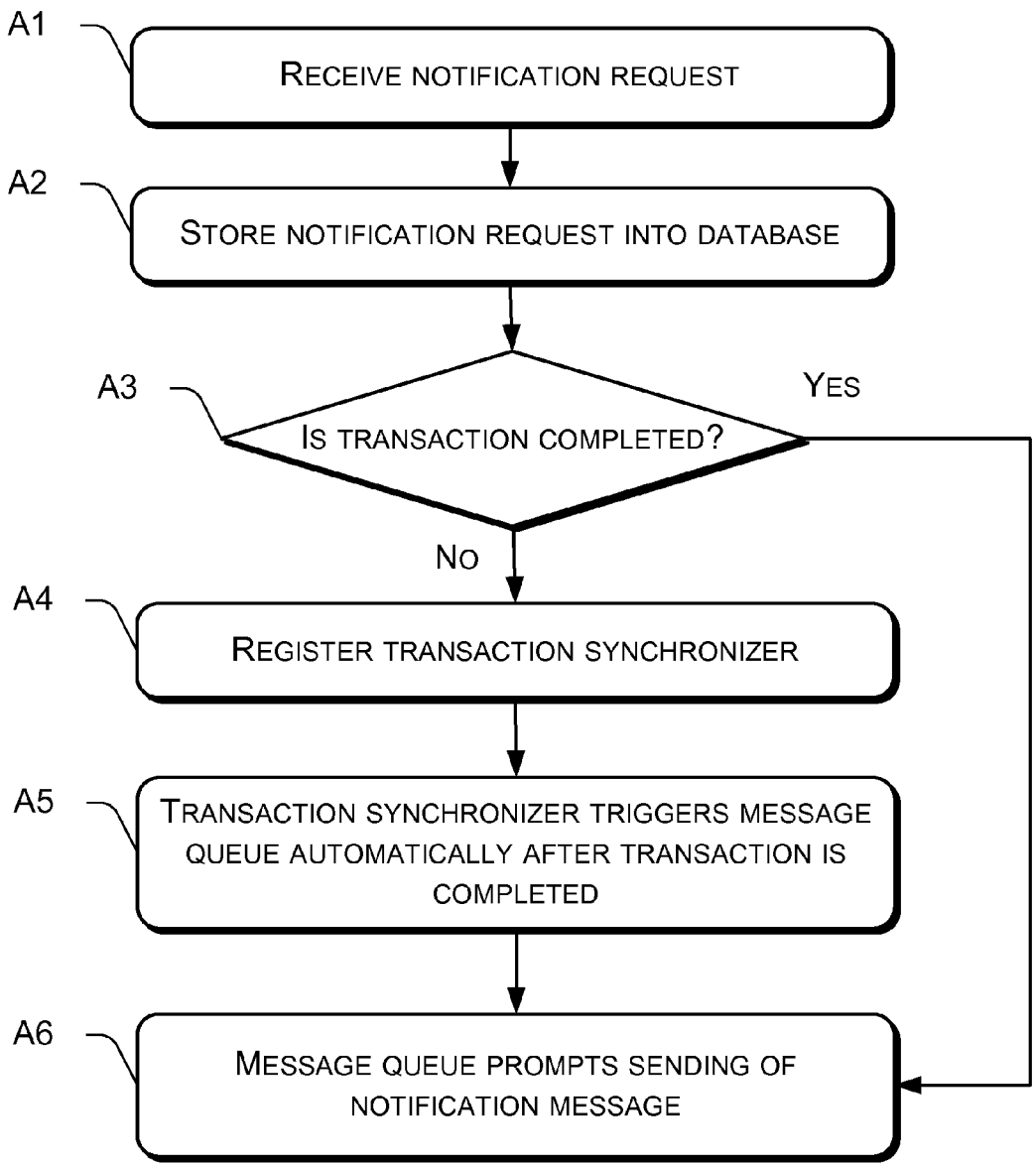
FIG. 6 shows a flow chart of a registering process in the disclosed message notification method.

FIG. 6 shows a flow chart of a registering process in the disclosed message notification method. The registration includes the following steps:

At Step A1, a notifying client receives a message notification request from a business application. The message notification request may include the content of the notification message.

At Step A2, the notifying client stores the message notification request into a database until the associated notification message is successfully sent. This can avoid the irreparable loss of the notification message due to instability of the network, the server or the software system.

At Step A3, the notifying client determines whether the business transaction associated with the notification message has been completed. If the business transaction is still in progress, the process continues to Steps A4, A5 and A6. If the business transaction is completed, the notifying client will automatically trigger a message queue and the process will directly proceed to Step A6. Take a message notification between an online bank and a merchant as an example. The business transaction associated with the notification message can be a user making a payment using the online bank. If the payment is successfully made, the business transaction is completed. Otherwise, the business transaction is still in progress. The notification message can include a result of the user payment indicating whether the payment has been completed. In the current exemplary embodiment, since the notifying client is embedded in the business application system, it may register the message notification request into the database within the business transaction. This can achieve consistency between the business transaction processing and the registration of notification request without having to use complicated mechanisms.

At Step A4, the notifying client registers a transaction synchronizer in a transaction management unit. The transaction management unit refers to the software for managing transactions and may include transaction synchronizers. The transaction synchronizer being registered is set up in the notifying client and is used to send to the notifying server through the message queue a request for immediate delivery of the notification message after the associated transaction is submitted. This can ensure the timeliness of the notification.

At Step A5, after the transaction is completed, the transaction synchronizer triggers the message queue automatically.

At Step A6, the message queue sends to the notification executing unit a request for immediate sending the notification message, prompting the notifying server to perform message transmission, thus ensuring the immediacy of the notification.

Figure 7:
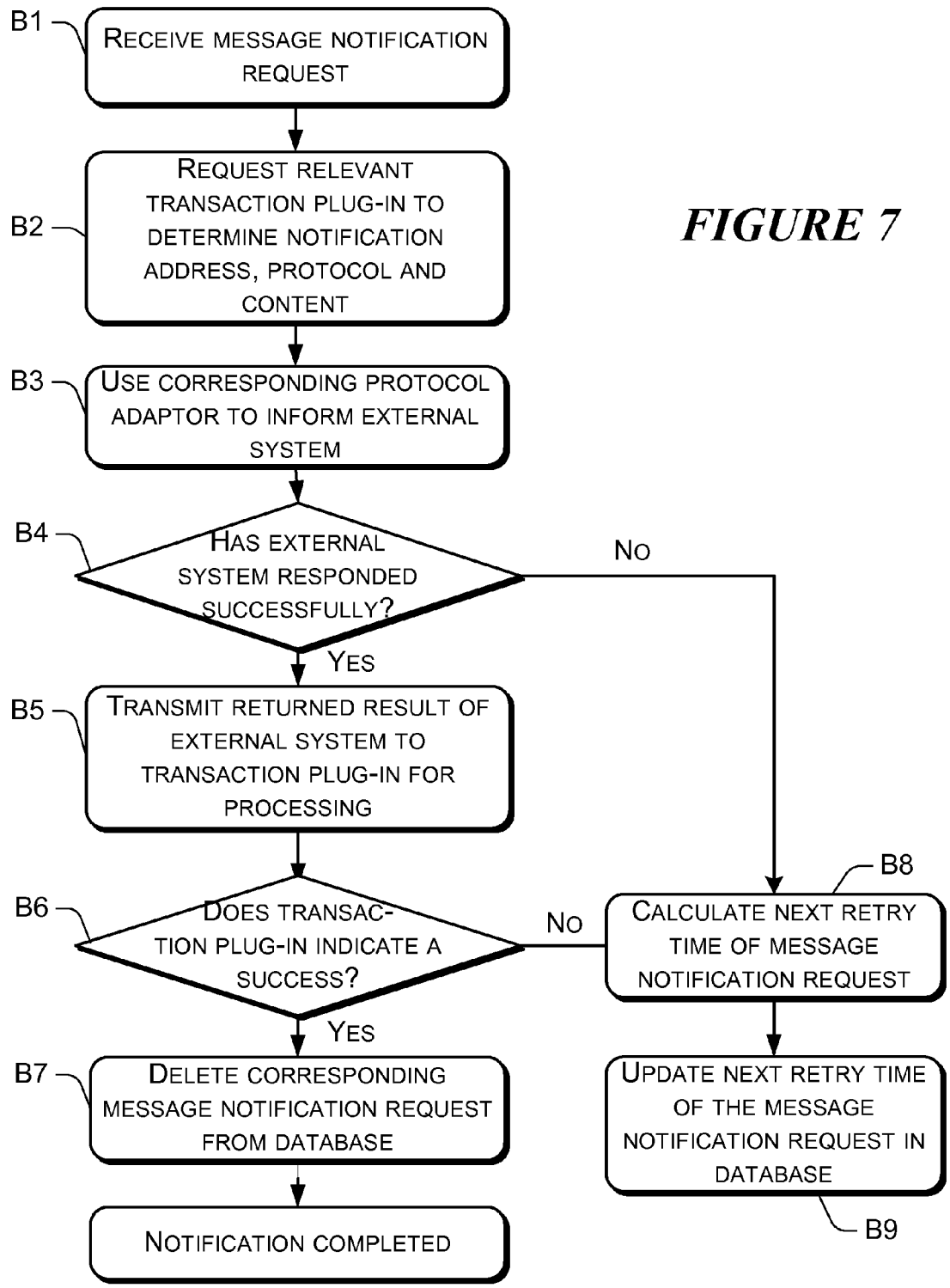
FIG. 7 shows a flow chart of sending a notification message in the disclosed message notification method.

FIG. 7 shows a flow chart of a notification message delivery process. The delivery process includes the following steps:

At Step B1, a notification executing unit receives a new message notification request from a notifying client sent through a message queue, or a message notification retry request sent from a notification recovering unit. If the new message notification request from the message queue and the message notification retry request from the notification recovering unit are received at the same time, the notification executing unit preferably performs multithread processing and sends both the new notification message and the retrying notification message at the same time. Alternatively, the notification executing unit can send the notification messages separately based on priorities.

At Step B2, the notification executing unit selects a business transaction plug-in from a business transaction plug-in library according to the type of the message notification request, and sends the message notification request to the business transaction plug-in for pre-processing to obtain actual notification address, notification protocol and notification parameters of an external system.

At Step B3, the notification executing unit selects a suitable protocol adaptor based on the notification protocol and provides the content of notification message, the notification address and the notification parameters, to the protocol adaptor for actual message delivery.

At Step B4, if the network, server and systems of both parties are in normal operation, the message is sent to the external system through the Internet. Upon receiving and processing the message, the external system returns a processing result. Otherwise, the notification executing unit can automatically detect that the notification message did not reach the external system, and the process will go to Steps B8 and B9.

At Step B5, the notification executing unit sends the returned result to the business transaction plug-in and let the business transaction plug-in complete the corresponding business transaction processing. In the above example, upon receiving the returned result of the external system, the business transaction plug-in may need to update the status of the trade to "item shipped", record the details of the invoice and notify the user about the shipping status. Since the notifying server is shared for common use and not related to any particular type of business transactions, the above processing is carried out by a suitable business transaction plug-in.

At Step B6, the business transaction plug-in determines whether a retry for message delivery is needed. The business transaction plug-in makes the decision based on whether there is a returned result and whether the format and the content of the returned result are valid. Still using the above example for illustration, if the returned result has valid shipping information of the merchant, the business transaction plug-in will consider the message notification to be successful. If no returned result is received or the returned result has invalid format, or if the merchant indicates explicitly in the returned result that it is temporarily unable to process and needs a certain period of time for retry, the business transaction plug-in will then consider this message notification to be unsuccessful and need a retry.

Since a failure of message notification may not only be caused by failures of the network or systems but may also depend on whether the business transaction itself is successful, the determination responsibility is taken by a business transaction plug-in. This is because the general-purpose notifying server can only determine whether there are failures in the network and systems, but cannot decide whether the business transaction itself is successful. Nevertheless, since obvious failures in the network and systems can be determined by the notifying server, under such circumstances the notifying server may directly decide whether a retry is needed.

At Step B7, if the business transaction plug-in determines that no retry is needed, the notifying server will delete the corresponding message notification request from the database and successfully complete the delivery of the notification message.

At Step B8, if the notification message cannot reach the external system due to various reasons such as network problems, or if the business transaction plug-in indicates that a retry for the message is needed, the notifying server will calculate the time interval for the next retry according to a retry strategy and set the time for the next retry to be the current time plus the calculated time interval.

At Step B9, for the notification messages waiting to be resent, the notifying server updates the sending times of corresponding message notification requests in the database according to the calculated retry times and waits for the notification recovering unit to perform a re-schedule.

By expanding business transaction plug-ins, the above process of sending notification messages can provide support to various types of transaction notifications using the same message notification system. By extending protocol processors/adaptors, support can also be provided for notifications of different protocols in the same message notification system. Moreover, a receiving party of the notification message has no need to implement any special secure messaging transmission protocol, but only needs to return a message processing result according to the business transaction requirement in order to reliably receive messages from the sender of message notification.

Figure 8:
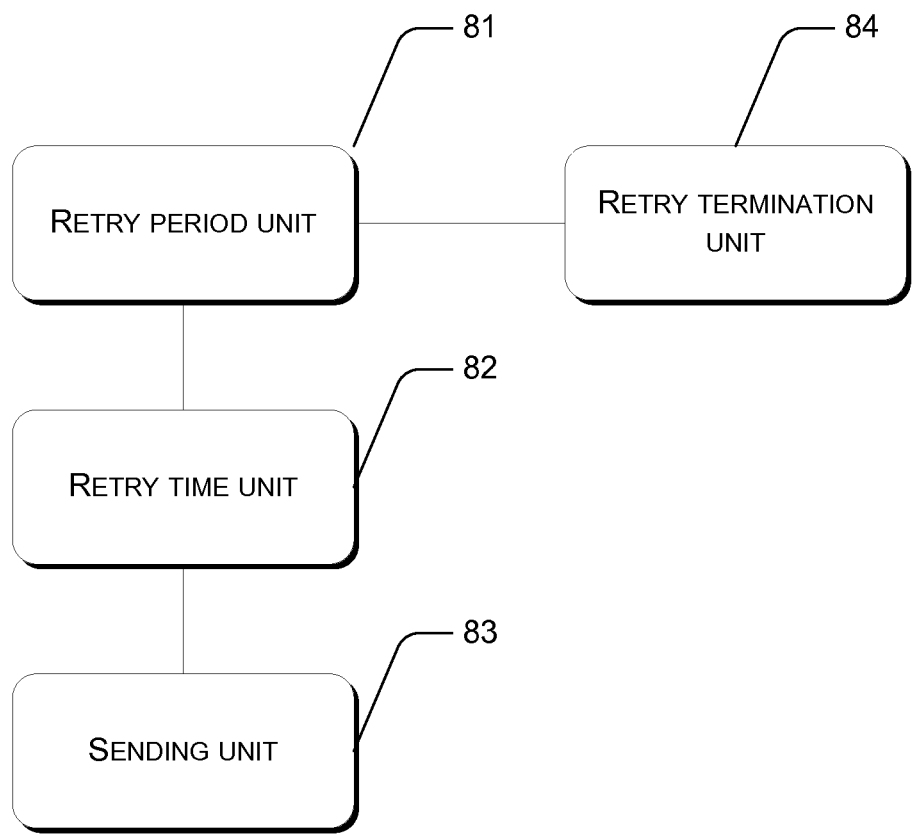
FIG. 8 shows a schematic diagram of a message resending system in accordance with the present invention.

FIG. 8 shows a schematic diagram of a message resending system in accordance with the present invention. The message resending system includes a retry period unit 81, a retry time unit 82 and a sending unit 83. The retry period unit sets a retry period for each message that needs to be resent. The retry period increases as the number of retries increases. The method of setting a value for the retry period has been described above and is not be repeated here. The retry period unit 81 sends the value of the retry period to the retry time unit 82. The retry time unit then determines a retry time according to the retry period. One simple method is to set the retry time to be a current time plus the retry period. The sending unit subsequently sends the message after the retry time is reached.

The message resending system may also include a retry termination unit 84. The retry termination unit 84 monitors the number of retries or the retry periods recorded by the retry period unit 81. A user can set up the retry termination unit 84 to stop resending a message if the number of retries is greater than or equal to a preset value or if the retry period is greater than or equal to a preset value.

The method and system for message retransmission in this invention can minimize the number of retries while maximizing the timeliness of delivering a message to a receiving party of the message. Moreover, targeting the pattern of short term and medium and long term communication failures over the Internet, the method and system of this invention provide a practical and efficient way of handling timeout and message resending. As the number of retries increases, the interval between retry times increases. The change in the retry time interval gives a balanced consideration of timeliness and efficiency of notification recovery at the same time. For short term communication failures, the invention can timely send a message notification to an opposite end after the failure is fixed; while in the event of a medium and long term failure the cost of making too many unnecessary retries may be avoided.

The present invention also provides a method and a system for reliable intersystem message notification that makes as few as possible retries while attempts as timely as possible to deliver a message to a receiving party of the message. The method and system for reliable intersystem message notification in this invention are suitable for use between any cooperating systems. Especially when the message notification is performed between systems over the Internet, the present invention can solve the problem of irreparable loss of notification messages caused by unreliability of the network and failures in hardware and software, and ensure timely and reliable delivery of the message. This invention supports a variety of transmission protocols between different systems. The receiving party can reliably receive notification messages without the need of implementing complicated interaction protocols, making this invention suitable for widespread use in the Internet. The method and the system can also support multiple business transaction processing, serve as a universal business transaction application, and be flexibly expanded to multiple business transactions and protocols.

The methods and systems for message transmission and reliable intersystem message notification in this invention are described in details above. Exemplary embodiments are employed to illustrate the concept of the present invention in this document. In particular, the method and system of this invention are suitable for use between any cooperating systems but not restricted to the use between Internet-based systems. Even though the present invention can be optimized to ensure reliable intersystem message notification over the Internet and is particularly suitable for widespread use in the Internet, this preference should not be interpreted as a limitation to the claims of this invention. The exemplary embodiments are only used for better understanding of the method and core concepts of the present invention. Based on the concepts of this invention, a person of ordinary skills in art may make modifications to the practical implementation and application areas. In conclusion, the content of this description should not be interpreted as limitations to the present invention.

The invention claimed is:

1. A method for message retransmission, the method comprising:
receiving a request for a transmission of a message for a notification;
transmitting the message;
determining whether the notification is successful;
in an event that the notification is successful, deleting the message;
in an event that the notification is not successful:
setting a time interval for a retransmission, the time interval increasing as a number of retransmissions increases,
updating a retransmission time for the retransmission to generate an updated retransmission time based on the calculated time interval, and
transmitting the message at the updated retransmission time;
receiving an addition request for one transmission of an additional message; and
transmitting the message and the additional message based on predetermined priorities associated with the message and the additional message respectively.

2. The method as recited in claim 1, wherein the determining whether the notification is successful comprises determining that the notification is successful if:
a returned result in response to the message is received, and
a format and a content of the returned result are valid based on a predetermined rule.

3. The method as recited in claim 1, further comprising obtaining a notification address, a notification protocol and a notification parameter that are associated with the message, and wherein the transmitting the message is based on the notification address, the notification protocol and the notification parameter.

4. The method as recited in claim 1, wherein the updated retransmission time is the time interval after a current time.

5. The method as recited in claim 1, further comprising abandoning auto-retry when a number of retries reaches or exceeds a preset value.

6. The method as recited in claim 1, further comprising abandoning auto-retry when the time interval reaches or exceeds a preset value.

7. The method as recited in claim 1, wherein the time interval has a variable increment as a number of retries performed increases.

8. A system of intersystem message notification, the system comprising:
a notification server configured to:
receive a request for a transmission of a message for a notification;
determine whether the notification is successful;
in an event that the notification is successful, delete the message;
in an event that the notification is not successful:
setting a time period for a retransmission, the time period increasing as a number of previous transmissions of the message increases, update a retransmission time for the retransmission to generate an updated retransmission time based on the determined time period, and transmit the message at the updated retransmission time;

receive an addition request for one transmission of an additional message; and transmit the message and the additional message based on predetermined priorities associated with the message and the additional message respectively.

9. The system as recited in claim 8, wherein the updated retransmission time is the time period after a current time.

10. The system as recited in claim 8, wherein the notification server is further configured to abandon retransmission after a predetermined number of unsuccessfully retransmissions.

11. The system as recited in claim 8, wherein the time period has a variable increment as a number of retries performed increases.

12. The system as recited in claim 8, wherein the notification is not successful if a return message or a confirmation from a recipient of the message is not received.

13. The system as recited in claim 8, wherein the notification server is further configured to:

determining an address and a transmission protocol of a recipient of the message based on a transaction type of the message; and transmitting the notification message to the address using the transmission protocol.

14. The system as recited in claim 8, wherein the system further comprises a database configured to store a plurality of messages, and wherein the notification server is further configured to:

periodically identify one or more messages that are due for retransmissions; and resending the identified messages.

* * * * *